US012246426B2

(12) United States Patent
Takeuchi et al.

(10) Patent No.: US 12,246,426 B2
(45) Date of Patent: Mar. 11, 2025

(54) ROTARY HAMMER

(71) Applicant: MAKITA CORPORATION, Anjo (JP)

(72) Inventors: Hajime Takeuchi, Anjo (JP); Yoji Inoue, Anjo (JP); Masanori Furusawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 10 days.

(21) Appl. No.: 18/211,009

(22) Filed: Jun. 16, 2023

(65) Prior Publication Data

US 2024/0009823 A1 Jan. 11, 2024

(30) Foreign Application Priority Data

Jul. 6, 2022 (JP) ................................ 2022-109128

(51) Int. Cl.
*B25D 16/00* (2006.01)

(52) U.S. Cl.
CPC ...... *B25D 16/006* (2013.01); *B25D 2211/068* (2013.01); *B25D 2216/0015* (2013.01); *B25D 2216/0023* (2013.01); *B25D 2216/0084* (2013.01); *B25D 2250/121* (2013.01)

(58) Field of Classification Search
CPC .................................................... B25D 16/006
See application file for complete search history.

(56) References Cited

U.S. PATENT DOCUMENTS 4,236,588 A * 12/1980 Moldan ................ B25D 16/006 74/22 A
5,669,730 A * 9/1997 Bidaux .................. B25D 17/08 403/321
5,842,527 A * 12/1998 Arakawa .............. B25D 16/006 173/104
7,051,820 B2 * 5/2006 Stirm .................. B25D 16/003 173/109
7,124,839 B2 * 10/2006 Furuta ..................... B25B 21/00 173/104
7,303,026 B2 * 12/2007 Frauhammer ........ B25D 16/003 173/48
7,308,948 B2 * 12/2007 Furuta .................. B25B 21/023 173/48
7,410,007 B2 * 8/2008 Chung .................... B25B 21/00 173/176

(Continued)

FOREIGN PATENT DOCUMENTS

EP 0427647 A1 * 5/1991 ............... B25D 9/14
JP 2007-144550 A 6/2007

*Primary Examiner* — Lucas E. A. Palmer
(74) *Attorney, Agent, or Firm* — Oliff PLC

(57) ABSTRACT

A rotary hammer includes a tool body, a tool holder, a cylinder, and a coupling member. The tool holder has a tubular shape and a longitudinal axis. The tool holder is configured to hold a tool accessory to be movable along the longitudinal axis and is supported by the tool body to be rotatable around the longitudinal axis. The cylinder extends coaxially with the tool holder and is supported by the tool body to be rotatable around the longitudinal axis. The coupling member is between the tool holder and the cylinder in a radial direction of the tool holder and is engaged with the tool holder and the cylinder to couple the tool holder and the cylinder together such that the tool holder and the cylinder integrally rotate.

17 Claims, 4 Drawing Sheets

(56) References Cited

U.S. PATENT DOCUMENTS

| | | | | |
|---|---|---|---|---|
| 8,167,054 | B2 * | 5/2012 | Nakashima | B25D 17/24 173/162.1 |
| 8,485,274 | B2 * | 7/2013 | Ikuta | B25D 17/24 173/91 |
| 10,500,706 | B2 * | 12/2019 | Takeuchi | B25D 11/062 |
| 10,513,022 | B2 * | 12/2019 | Machida | B25D 17/04 |
| 2002/0179310 | A1 * | 12/2002 | Kuhnle | B23Q 3/12 173/114 |
| 2006/0086513 | A1 * | 4/2006 | Hashimoto | B25D 11/062 173/48 |
| 2010/0000751 | A1 * | 1/2010 | Aoki | B25D 17/24 173/114 |
| 2015/0041170 | A1 * | 2/2015 | Yoshikane | B25D 16/00 173/104 |

* cited by examiner

ROTARY HAMMER

CROSS-REFERENCE TO RELATED APPLICATION

The present application claims priority to Japanese patent application No. 2022-109128 filed on Jul. 6, 2022, the contents of which are hereby fully incorporated herein by reference.

TECHNICAL FIELD

The present disclosure relates to a rotary hammer. Specifically, the present disclosure relates to a rotary hammer including a tool holder that is configured to removably hold a tool accessory, and a cylinder that is coupled to the tool holder.

BACKGROUND

A rotary hammer is configured to linearly reciprocate a tool accessory along a driving axis, and to rotationally drive the tool accessory around the driving axis. For these purposes, the rotary hammer includes a tool holder that is configured to hold the tool accessory to be movable in its axial direction, and a cylinder that is rotatable integrally with the tool holder. For example, Japanese laid-open patent publication No. 2007-144550 discloses a rotary hammer including a tool holder and a cylinder that are coupled to each other by a coupling pin. Specifically, a front end portion of the cylinder is fitted around an outer periphery of a rear end portion of the tool holder. The coupling pin is inserted from radially outside of the cylinder into a hole formed through a wall of the cylinder and a hole formed in a wall the tool holder.

SUMMARY

In the above-described rotary hammer, in order to couple the tool holder and the cylinder, an assembler (a person who assembles the rotary hammer) needs to position the tool holder and the cylinder precisely in an axial direction and a circumferential direction of the tool holder such that the hole of the tool holder and the hole of the cylinder communicate with each other, and then insert the coupling pin into the holes from radially outside of the cylinder. Such a coupling operation of the tool holder and the cylinder may be troublesome.

Accordingly, it is a non-limiting object of the present disclosure to provide techniques that facilitates a coupling operation of a tool holder and a cylinder of a rotary hammer.

One non-limiting aspect according to the present disclosure provides a rotary hammer (hammer drill) that includes a tool body, a tool holder, a cylinder, and a coupling member. The tool holder has a tubular shape and a longitudinal axis. The tool holder is configured to hold a tool accessory to be movable along the longitudinal axis. The tool holder is supported by the tool body to be rotatable around the longitudinal axis. The cylinder extends coaxially with the tool holder and is supported by the tool body to be rotatable around the longitudinal axis. The coupling member is between the tool holder and the cylinder in a radial direction of the tool holder. The coupling member is engaged with the tool holder and with the cylinder to couple the tool holder and the cylinder together such that the tool holder and the cylinder integrally rotate.

In the rotary hammer according to this aspect, the coupling member between the tool holder and the cylinder in the radial direction couples the tool holder and the cylinder to allow the tool holder and the cylinder to integrally rotate. Thus, in a coupling structure of this aspect, the tool holder and the cylinder can be easily positioned relative to each other, compared to a known coupling structure that utilizes a coupling pin that is inserted into holes of the cylinder and the tool holder in the radial direction. Further, the coupling structure of this aspect does not require a stopper or the like that is necessary for preventing the coupling pin from dropping out of the holes in the known structure. Consequently, the coupling structure of this aspect can facilitate and simplify a coupling operation for coupling the tool holder and the cylinder such that the tool holder and the cylinder integrally rotate, compared to the coupling operation for the above-described known coupling structure that utilizes the coupling pin.

DESCRIPTION OF EMBODIMENTS

Figure 1:
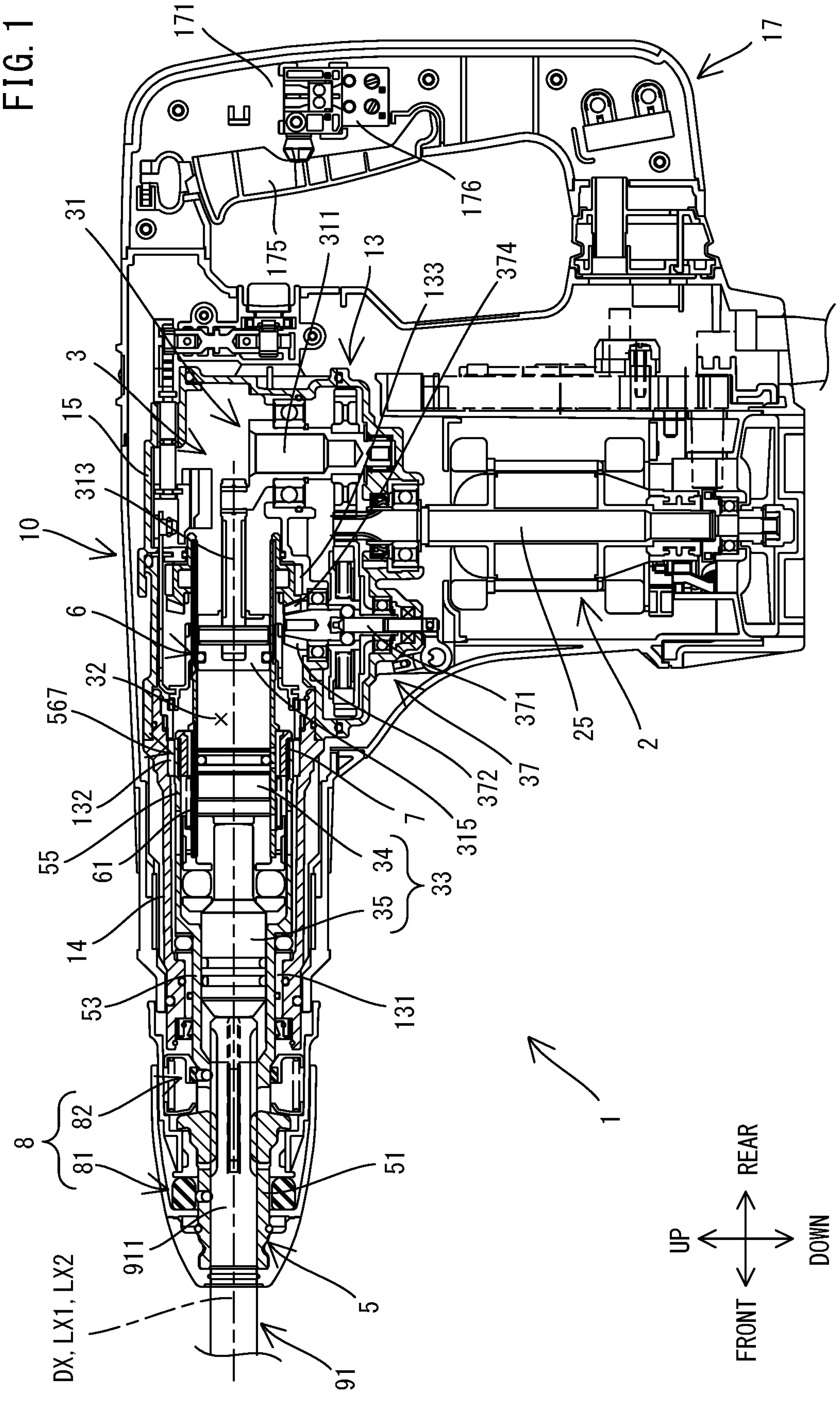
FIG. 1 is a sectional view of a rotary hammer.

In one non-limiting embodiment according to the present disclosure, the longitudinal axis may define a front-rear direction of the rotary hammer. The tool holder may have a front end portion and a rear end portion. The front end portion of the tool holder may be configured to receive the tool accessory. The rear end portion of the tool holder may be disposed radially outward of the cylinder and may be coupled to the cylinder via the coupling member. A user of the rotary hammer may sometimes grip a region of the rotary hammer that is close to the tool accessory (e.g., a portion surrounding the front end portion of the tool holder) in order to stabilize a working posture. Accordingly, this embodiment is preferable because a diameter of the front end portion of the tool holder can be made smaller than the rear end portion of the tool holder.

In addition or in the alternative to the preceding embodiment, the cylinder may have a ventilation hole. The coupling member may be disposed radially outward of the cylinder. The coupling member may have a ventilation passage that is configured to communicate with the ventilation hole to allow air to flow between an inner space of the cylinder and an outer space of the cylinder. The ventilation hole of the cylinder may be provided for adjusting a time at which the tool accessory is driven and/or for preventing so-called idle striking. According to this embodiment, even if the coupling member covers the ventilation hole, the ventilation passage of the coupling member can allow the ventilation hole to properly function.

In addition or in the alternative to the preceding embodiments, the coupling member may be configured to define a position of the rear end portion of the tool holder in the front-rear direction. According to this embodiment, the coupling member can exhibit not only a function that couples the tool holder and the cylinder together but also a function that positions the tool holder. This configuration can eliminate the need for an additional structure (element) for positioning the tool holder in the front-rear direction.

In addition or in the alternative to the preceding embodiments, the rotary hammer may further include a bearing that is disposed around an outer periphery of an overlapping portion. The tool holder and the cylinder may be rotatably supported via the bearing. Here, the overlapping portion may refer to a portion (region) where the tool holder, the coupling member and the cylinder overlap with each other in the radial direction. According to this embodiment, the bearing can stably support the tool holder and the cylinder that are coupled via the coupling member to integrally rotate.

In addition or in the alternative to the preceding embodiments, the tool holder and the coupling member may be coupled to each other by way of engagement between a recess and a protrusion. The cylinder and the coupling member may be coupled to each other by way of engagement between a recess and a protrusion. According to this embodiment, a simple structure can achieve reliable torque transmission from the cylinder to the tool holder. Examples of the engagement between the recess and the protrusion may include engagement between a key groove and a key, and a spline coupling (an engagement between inner teeth and outer teeth).

In addition or in the alternative to the preceding embodiments, the rotary hammer may further include an idle-striking prevention mechanism. The idle-striking prevention mechanism may be disposed on a straight line, which extends from the coupling member and which is substantially parallel to the longitudinal axis. According to this embodiment, a space that is formed by the coupling member interposed between the tool holder and the cylinder in the radial direction can be utilized to accommodate the idle-striking prevention mechanism.

In addition or in the alternative to the preceding embodiments, the idle-striking prevention mechanism may include a movable member and a spring. The movable member may be disposed frontward of the coupling member and may be movable in the front-rear direction relative to the cylinder. The spring may bias the movable member. The coupling member may be configured as a spring seat that receives a rear end of the spring. According to this embodiment, the coupling member is utilized as the spring seat for the spring of the idle-striking prevention mechanism, so that the idle-striking prevention mechanism can be made compact.

In addition or in the alternative to the preceding embodiments, the coupling member may be made of sintered metal. According to this embodiment, the coupling member can be made lighter in weight, compared to a case in which the coupling member is a machined metal component or a component molded from molten metal.

In addition or in the alternative to the preceding embodiments, the rotary hammer may further include an impact bolt that is disposed in the tool holder to be slidable in the front-rear direction and that is configured to strike the tool accessory. The coupling member may be disposed rearward of a slide part, which is a portion of the tool holder along which an outer peripheral surface of the impact bolt slides. If the cylinder is coupled to the slide part of the tool holder or to a portion that is frontward of the slide part (i.e., a portion closer to the tool accessory) via the coupling member, the cylinder needs to be disposed radially outward of the tool holder and the coupling member. Such arrangement leads to an larger diameter of the portion that is closer to the tool accessory and that may be gripped by a user to be larger. On the contrary, according to this embodiment, the diameter of the portion closer to the tool accessory can be made smaller.

A rotary hammer (hammer drill) 1 according to a non-limiting embodiment of the present disclosure is now described with reference to FIGS. 1 to 4. The rotary hammer 1 is configured to linearly reciprocate a tool accessory 91 that is removably mounted thereto along a driving axis DX (such an action is hereinafter referred to as a hammering action), and to rotationally drive the tool accessory 91 around the driving axis DX (such an action is hereinafter referred to as a rotary action). Examples of the tool accessory 91 mountable to the rotary hammer 1 include a hammer bit and a drill bit.

First, a general structure of the rotary hammer 1 is described. As shown in FIG. 1, an outer shell of the rotary hammer 1 is mainly formed by a main housing 10 and a handle 17 that is coupled to the main housing 10.

The main housing 10 mainly houses a tool holder 5 that is configured to removably hold the tool accessory 91, a motor 2, a driving mechanism 3 that is configured to drive the tool accessory 91 in response to driving of the motor 2, and a vibration reduction mechanism 8. The driving mechanism 3 and the tool holder 5 are housed within (or supported within) an inner housing (also referred to as a tool body) 13 disposed within the main housing 10.

The handle 17 includes a grip part 171 that is configured to be gripped by a user. The grip part 171 extends in a direction that intersects the driving axis DX (more specifically, in a direction that is substantially orthogonal to the driving axis DX). A switch lever 175, which is configured to be depressed by the user, is disposed at one end portion of the grip part 171 in its longitudinal direction. A switch 176 is housed within the grip part 171. When the switch lever 175 is depressed and thus the switch 176 is turned ON, the motor 2 is driven and the tool accessory 91 is reciprocated and/or rotationally driven by the driving mechanism 3.

Elements (structures) that are disposed within the main housing 10 are now described. In the following description, for the sake of convenience, an extension direction of the driving axis DX (hereinafter, also simply referred to as a driving-axis direction) is defined as a front-rear direction of the rotary hammer 1. In the front-rear direction, the side on which the tool holder 5 is located is defined as a front side of the rotary hammer 1, while the side on which the grip part 171 is located is defined as a rear side of the rotary hammer 1. The longitudinal direction of the grip part 171 is defined as an up-down direction of the rotary hammer 1. In the up-down direction, the side on which the switch lever 175 is located is defined as an upper side, while the opposite side is defined as a lower side. A direction that is orthogonal to the front-rear direction and the up-down direction is defined as a left-right direction.

The tool holder 5 is a tubular (cylindrical) member having a longitudinal axis LX1. The tool holder 5 is configured to removably receive a portion of the tool accessory 91 to hold the tool accessory 91 to be linearly slidable in an extension direction of the longitudinal axis LX1 and to be non-rotatable relative to the tool holder 5. The tool holder 5 is supported by the inner housing 13 to be rotatable around the longitudinal axis LX1. Thus, the tool accessory 91 is rotated integrally with the tool holder 5 around the longitudinal axis LX1. The longitudinal axis LX1 of the tool holder 5 thus defines the driving axis DX of the tool accessory 91. The tool holder 9 is housed within a cylindrical front half (hereinafter also referred to as a barrel part 14) of the inner housing 13. The remaining portion of the inner housing 13

(i.e., a portion that extends rearward of the barrel part 14, which is hereinafter referred to as a gear housing 15) houses the driving mechanism 3.

A cylinder 6 is coupled to the tool holder 5. The cylinder 6 is a tubular (cylindrical) member and is disposed coaxially with the tool holder 5 within the inner housing 13. The cylinder 6 is coupled to a rear end portion of the tool holder 5 via a coupling member 7. The tool holder 5 and the cylinder 6 are integrally rotatable (rotationally fixed to each other) around the driving axis DX. The details of the tool holder 5 and the cylinder 6 will be described later.

The motor 2 of this embodiment is a brushed motor. The motor 2 is driven by electric power supplied from an external alternate power source via a power cord, which is not shown. However, in an alternative embodiment, a brushless motor may be employed as the motor 2. Further, the motor 2 may be driven by electric power supplied from a rechargeable battery. In this embodiment, the motor 2 is disposed such that a rotational axis of a motor shaft 25 intersects the driving axis DX. However, in an alternative embodiment, the motor 2 may be disposed such that the rotational axis of the motor shaft 25 extends in parallel to the driving axis DX.

The driving mechanism 3 is now described. The driving mechanism 3 is operably coupled to the motor 2 (more specifically, the motor shaft 25) and is driven by the power generated by the motor 2. The driving mechanism 3 of this embodiment includes a motion converting mechanism 31 and a striking mechanism 33 for the hammering action, and a rotation transmitting mechanism 37 for the rotary action.

The motion converting mechanism 31 is operably coupled to the motor 2 and is configured to convert rotation of the motor shaft 25 into linear motion and to transmit the linear motion to the striking mechanism 33. In this embodiment, a crank mechanism having a well-known structure is employed as the motion converting mechanism 31. To be brief, the motion converting mechanism 31 includes a crank shaft 311, a connection rod 313, and a piston 315. The crank shaft 311 is operably coupled to the motor shaft 25 and is rotated by the motor shaft 25. The crank shaft 311 includes an eccentric pin. The connection rod 313 is operably coupled to the eccentric pin and the piston 315. The piston 315 is housed in the cylinder 6 and is slidable within the cylinder 6.

The motion converting mechanism 31 having the above-described structure may be replaced by a well-known mechanism that is configured to reciprocate a piston using an oscillating member (e.g., a swash bearing, or a wobble plate/bearing) in response to rotation of a rotary member.

The striking mechanism 33 is configured to linearly move and strike the tool accessory 91 so that the tool accessory 91 is linearly driven along the driving axis DX. In this embodiment, the striking mechanism 33 includes a striker 34 and an impact bolt 35. The striker 34 is disposed in front of the piston 315 within the cylinder 6 and is slidable within the cylinder 6. An air chamber 32 is formed between the striker 34 and the piston 315. The impact bolt 35 is an intermediate element that transmits kinetic energy of the striker 34 to the tool accessory 91. The impact bolt 35 is disposed in front of the striker 34 within the tool holder 5 and is slidable within the tool holder 5.

When the motor 2 is driven and thus the piston 315 is moved frontward, air in the air chamber 32 is compressed and thereby the pressure within the air chamber is increased. Thus, the striker 34 is pushed frontward at a high speed to strike the impact bolt 35, and the impact bolt 35 transmits the kinetic energy to the tool accessory 91. Accordingly, the tool accessory 91 is linearly moved frontward along the driving axis DX. When the piston 315 is moved rearward, the air in the air chamber 32 is expanded and thereby the pressure within the air chamber 32 is decreased, so that the striker 34 is pulled rearward. The tool accessory 91 is pressed against the workpiece and is thus moved rearward. The motion converting mechanism 31 and the striking mechanism 33 repeat the above-described actions.

The rotation transmitting mechanism 37 is operably coupled to the motor 2 and is configured to transmit the rotation of the motor shaft 25 to the tool holder 5. The rotation transmitting mechanism 37 is configured as a gear speed reducer having a well-known structure and is configured to reduce the speed of the rotation of the motor 2 as needed and then transmit the rotation to the tool holder 5. To be brief, the rotation transmitting mechanism 37 includes a small bevel gear 372 disposed on an intermediate shaft 371 that is rotated by the motor shaft 25, and a large bevel gear 374 fixed around an outer periphery of the cylinder 6. When the motor 2 is driven, the cylinder 6 and the tool holder 5 and thus the tool accessory 91 held by the tool holder 5 are rotationally driven around the driving axis DX by the rotation transmitting mechanism 37.

The rotary hammer 1 of this embodiment is configured to selectively operate in a hammer-only mode or in a rotary hammer mode. In the hammer-only mode, only the motion converting mechanism 31 and the striking mechanism 33 are driven so that only the hammering action is performed. In the rotary hammer mode, the motion converting mechanism 31, the striking mechanism 33, and the rotation transmitting mechanism 37 are driven, so that the hammering action and the rotary action are performed at the same time. Any known structure may be employed for switching the action modes. Thus, the description of the structure thereof is omitted here. It is noted that it is sufficient for the rotary hammer 1 to selectively perform at least one of the hammering action and the rotary action, and thus the rotary hammer 1 may include a rotation-only mode, in which only the rotary action is performed, in addition to the hammer-only mode and the rotary hammer mode.

The details of the tool holder 5 are now described.

Figure 2:
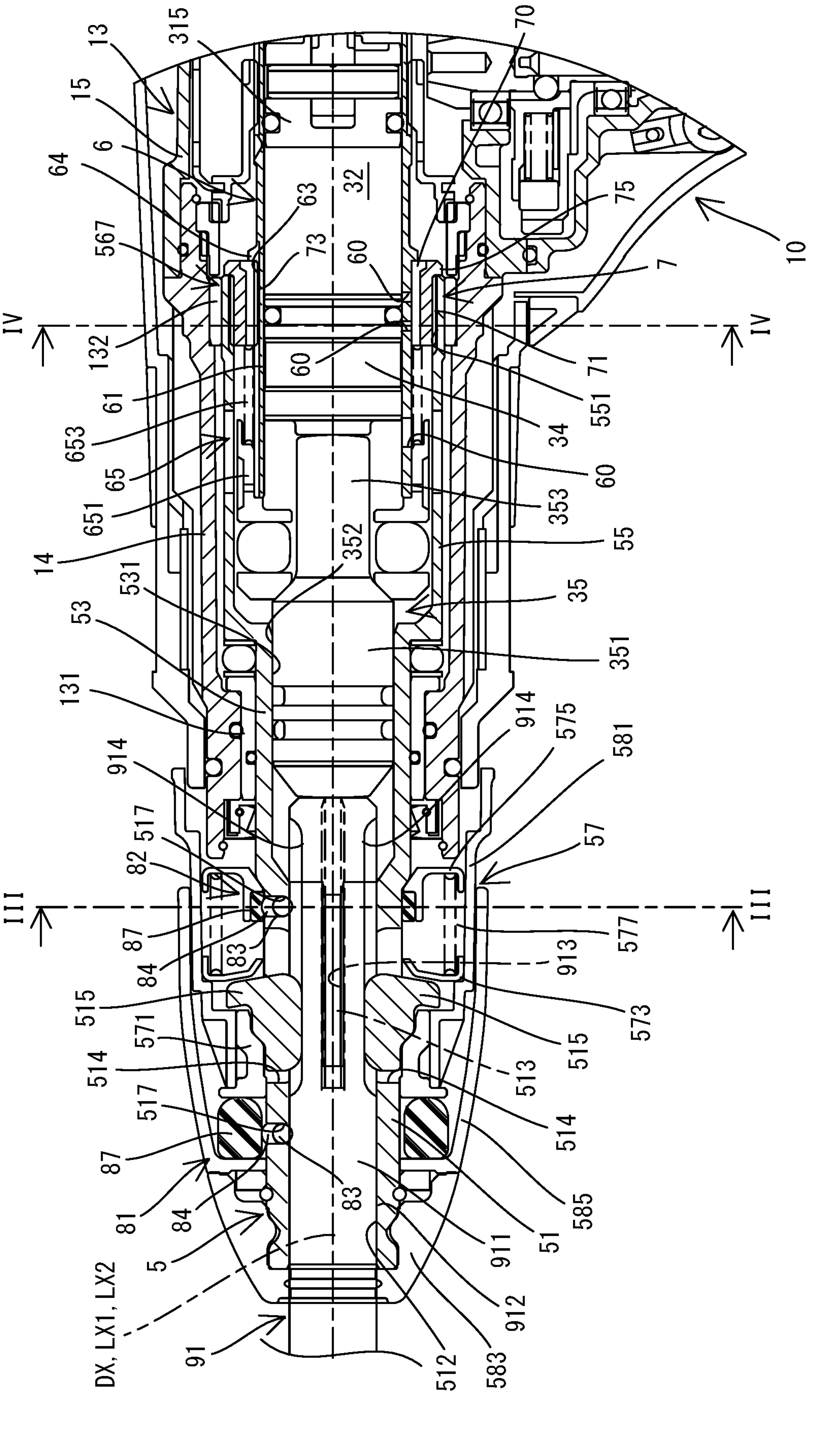
FIG. 2 is a partial, enlarged view of FIG. 1.
Figure 3:
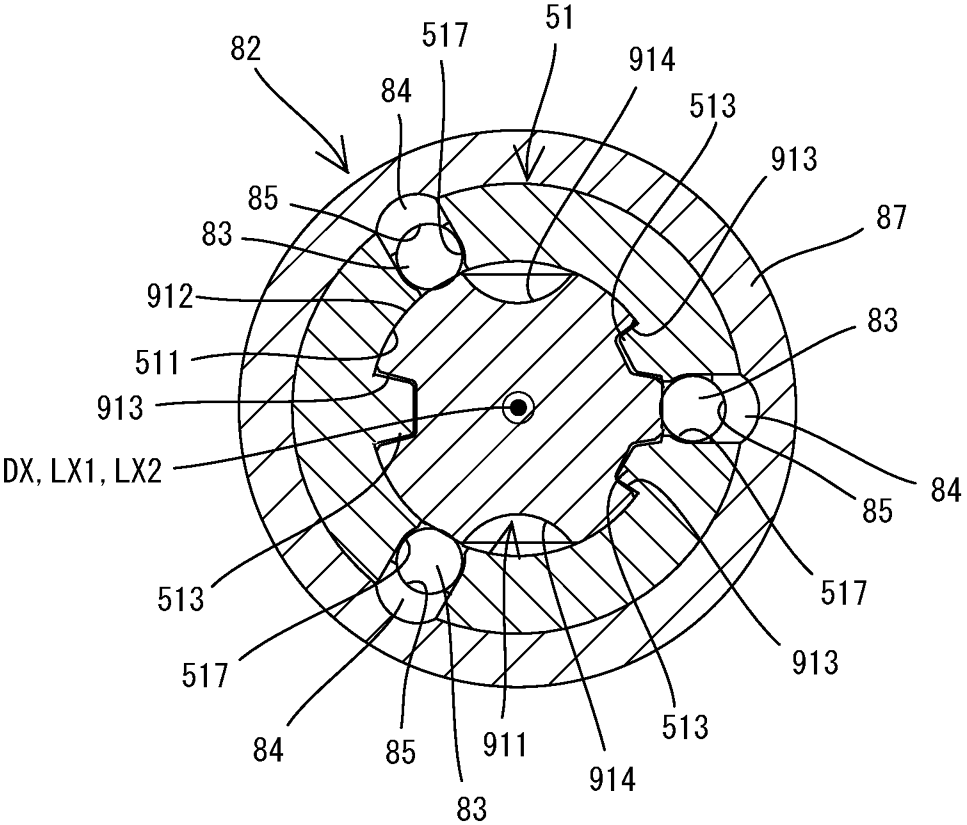
FIG. 3 is a sectional view taken along line III-III in FIG. 2, in which only a tool accessory, a tool holder, and a second elastically holding member are illustrated.

First, the tool accessory (also referred to as a bit) 91 that is mountable (attachable) to the tool holder 5 is described. As shown in FIGS. 2 and 3, the tool accessory 91 includes a shank 911 that is configured to be inserted into the tool holder 5. Rectangular grooves 913 and Semicircular grooves 914 are formed on an outer peripheral surface 912 of the shank 911.

Each of the rectangular grooves 913 is configured for torque transmission and has a substantially rectangular or trapezoidal section. In this embodiment, there are three rectangular grooves 913 that are spaced away from each other in a circumferential direction around the longitudinal axis LX2 of the tool accessory 91. Each of the rectangular grooves 913 extends in substantially parallel to the longitudinal axis LX2. Each of the semicircular grooves 914 is provided for preventing the tool accessory 91 from dropping off from the tool holder 5 and has a substantially semicircular section. In this embodiment, there are two semicircular grooves 914 that are disposed across the longitudinal axis LX2 of the tool accessory 91 to face each other. Each of the semicircular grooves 914 extends in substantially parallel to the longitudinal axis LX2. The rectangular grooves 913 and the semicircular grooves 914 are spaced away from each other in the circumferential direction.

As shown in FIG. 2, the tool holder 5 is a stepped cylindrical member. The tool holder 5 includes a small diameter part 51, a medium diameter part 53, and a large diameter part 55 from the front side in this order.

The small diameter part 51 is configured to receive the shank 911 of the tool accessory 91 and to slidably hold (house) the shank 911. Thus, an inner diameter of the small diameter part 51 is slightly larger than an outer diameter of the shank 911. An inner peripheral surface 511 of the small diameter part 51 and the outer peripheral surface 912 of the shank 911 are sliding surfaces that slide with each other.

Protrusions 513 are formed on the small diameter part 51. Each of the protrusions 513 protrudes radially inward from the inner peripheral surface 511 of the small diameter part 51 and extends in substantially parallel to the longitudinal axis LX1 (the driving axis DX) (i.e., in the front-rear direction) of the tool holder 5. The protrusions 513 are spaced away from each other in the circumferential direction around the longitudinal axis LX1 (the driving axis DX) of the tool holder 5. The protrusions 513 are configured for the torque transmission and disposed at positions that correspond to the rectangular grooves 913 of the shank 911 in the circumferential direction so as to fit in the rectangular grooves 913.

When the shank 911 is inserted into the small diameter part 51 in a state in which the protrusions 513 are fitted in the respective rectangular grooves 913, the longitudinal axis LX2 of the tool accessory 91 substantially coincides with the longitudinal axis LX1 (the driving axis DX) of the tool holder 5. Rotation of the tool accessory 91 relative to the tool holder 5 around the driving axis DX is restricted, so that both side surfaces of each of the protrusions 513 and both side surfaces of each of the rectangular grooves 913 function as torque transmitting surfaces.

Further, the small diameter part 51 has elongate holes 514. Each of the elongate holes 514 is a through hole that penetrates the small diameter part 51 in its radial direction. In this embodiment, there are two elongate holes 514 that are disposed across the longitudinal axis LX1 to face each other. Each of the elongate holes 514 extends in substantially parallel to the longitudinal axis LX1 (the driving axis DX) (i.e., in the front-rear direction). The elongate holes 514 respectively face the semicircular grooves 914 of the shank 911 in the radial direction in a state in which the protrusions 513 are fitted in the corresponding rectangular grooves 913 of the shank 911. A tool retainer 515 for preventing the tool accessory 91 from dropping off from the tool holder 5 is disposed in each of the elongate holes 514. The tool retainer 515 is a substantially L-shaped member. The tool retainers 515 partially protrude outward in the radial direction of the small diameter part 51 and held (retained) in the respective elongate holes 514 to be slidable in the front-rear direction along the elongate holes 514.

A holding mechanism 57 for the tool retainers 515 is disposed around the tool holder 5. The holding mechanism 57 includes a chuck ring 571, a front spring receiver 573, a rear spring receiver 575, and a spring 577. The chuck ring 571 is a tubular (cylindrical) member and is fitted around the outer periphery of the small diameter part 51 so as to surround front halves of the elongate holes 514. The front spring receiver 573 is an annular member and is fitted around the small diameter part 51 behind the tool retainers 515. The rear spring receiver 575 is a cylindrical member with a flange part and is fitted around a rear end portion of the small diameter part 51. The spring 577 is disposed between the front spring receiver 573 and the rear spring receiver 575 so as to bias the front spring receiver 573 and the rear spring receiver 575 away from each other.

Owing to the above-described structure, the rear spring receiver 575 is held in contact with a shoulder part between the small diameter part 51 and the medium diameter part 53. The front spring receiver 573 is in contact with the tool retainers 515 from behind and presses the tool retainers 515 forward. The tool retainers 515 are each held at a position (an initial position) where the tool retainer 515 is in contact with the chuck ring 571 from behind. Thus, the chuck ring 571 restricts the tool retainers 515 from moving forward and radially outward. The tool retainers 515 partially protrude into the small diameter part 51 through the respective elongate holes 514 and fit in the respective semicircular grooves 914 of the shank 911, so that the retainers 515 prevent the tool accessory 91 from dropping off from the tool holder 5.

A release cover 581 is disposed around the tool retainers 515 and the holding mechanism 57. The release cover 58 is configured to release the holding of the tool accessory 91 by the tool retainers 515. The release cover 581 is a tubular member and is supported to be movable in the front-rear direction relative to the tool holder 5. More specifically, a tubular cap 583 is fixed around a front end portion of the tool holder 5. A chuck cover 585 is fitted around the front end portion of the tool holder 5 behind the cap 583. The chuck cover 585 is a tubular member and is configured to surround the tool retainers 515 and the most part of the holding mechanism 57. The release cover 581 is supported by the chuck cover 585 to be slidable in the front-rear direction. The release cover 581 is biased frontward by the spring 577 via the front spring receiver 573.

When the user moves the release cover 581 rearward, the release cover 581 moves the front spring receiver 573 and the tool retainers 515 rearward against the biasing force of the spring 577. The tool retainers 515 move rearward within the respective elongate holes 514 and are allowed to move radially outward of the small diameter part 51. Thus, the tool accessory 91 can be removed.

The medium diameter part 53 of the tool holder 5 is connected to the rear end of the small diameter part 51 and extends rearward. The medium diameter part 53 has an inner diameter and an outer diameter that are larger than those of the small diameter part 51. The medium diameter part 53 is configured to slidably hold (house) the impact bolt 35. The impact bolt 35 includes a large diameter part 351 and a small diameter part 353 that extends rearward from a rear end of the large diameter part 351. The small diameter part 353 has an outer diameter smaller than that of the large diameter part 351. An inner diameter of the medium diameter part 53 of the tool holder 5 is very slightly larger than the outer diameter of the large diameter part 351 of the impact bolt 35. An inner peripheral surface 531 of the medium diameter part 53 of the tool holder 5 and an outer peripheral surface 352 of the large diameter part 351 of the impact bolt 35 serve as sliding surfaces that slide with each other.

The large diameter part 55 of the tool holder 5 is connected to the rear end of the medium diameter part 53 and extends rearward. The large diameter part 55 has an inner diameter and an outer diameter that are larger than those of the medium diameter part 53. A portion of the impact bolt 35 is disposed within the large diameter part 55. The large diameter part 55 extends to the rear end portion of the barrel part 14.

The details of the cylinder 6 are now described.

The cylinder 6 is a circular cylindrical member having a substantially uniform inner diameter. An outer diameter of the cylinder 6 is smaller than the inner diameter of the large diameter part 55 of the tool holder 5. As shown in FIG. 1, the cylinder 6 slidably holds (houses) the piston 315 and the striker 34. A portion of the cylinder 6 is disposed within a rear portion (radially inside) of the large diameter part 55 of the tool holder 5. In this embodiment, a portion that is substantially front half of the cylinder 6 is inserted into the rear portion of the large diameter part 55 of the tool holder 5. The portion of the cylinder 6 that is within the tool holder 5 is hereinafter also referred to as an insertion part 61.

Figure 4:
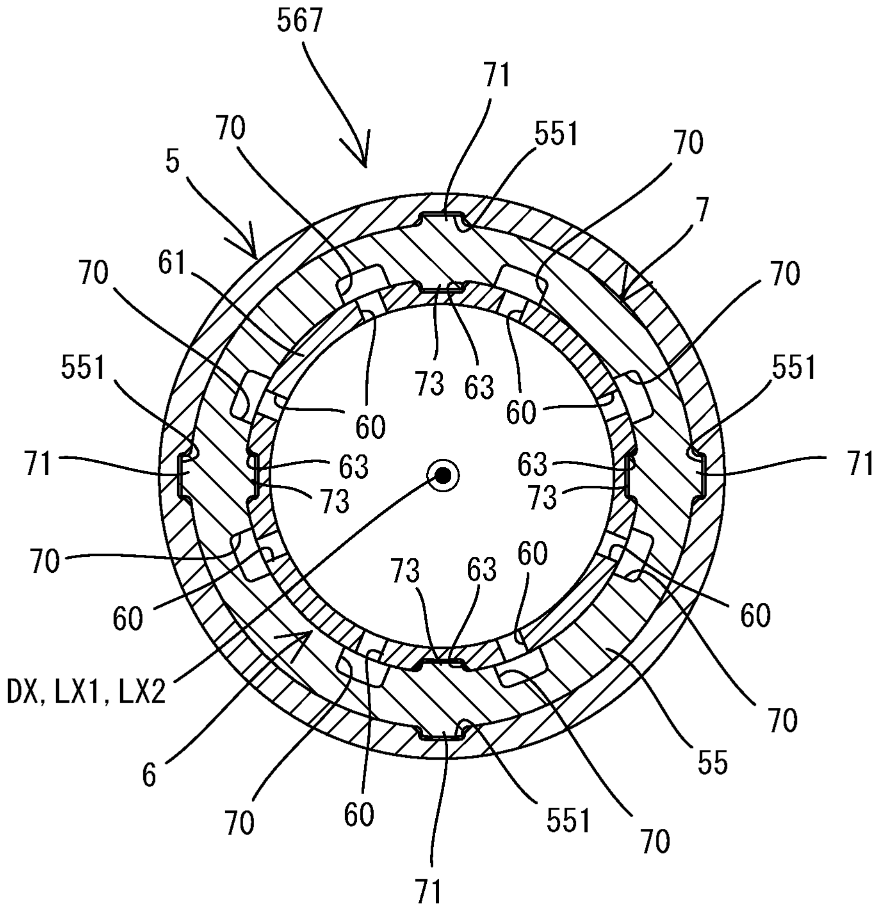
FIG. 4 is a sectional view taken along line IV-IV in FIG. 2, in which only the tool holder, a coupling member, and a cylinder are illustrated.

As shown in FIGS. 2 and 4, the insertion part 61 has a plurality of ventilation holes 60. Although the ventilation holes 60 cannot be actually viewed in FIG. 2, for the sake of description, the positions of the ventilation holes 60 in the front-rear direction are illustrated in the lower portion of the cylinder 6 in FIG. 2. Each of the ventilation holes 60 is a through hole that allows air to flow between an inner space and an outer space of the cylinder 6. In this embodiment, each of the ventilation holes 60 is provided for adjusting air pressure within the cylinder 6 (i.e., for setting a time at which the striker 34 is driven) and/or for preventing so-called idle striking. The idle striking refers to driving of the striking mechanism 33 while the tool accessory 91 is not inserted into the tool holder 5 or while the tool accessory 91 is not pressed against a workpiece (such a state may also be referred to as a no-load state).

The coupling structure between the tool holder 5 and the cylinder 6 is now described.

As shown in FIGS. 2 and 4, the coupling member 7 is disposed between the tool holder 5 and the cylinder 6 in the radial direction to be coaxial with the tool holder 5 and the cylinder 6. The tool holder 5 and the cylinder 6 are coupled to each other via the coupling member 7. The coupling member 7 is at a position corresponding to the rear end portion of the tool holder 5 (the rear end portion of the large diameter part 55) and a substantially central portion of the cylinder 6 in the front-rear direction.

The coupling member 7 is engaged with the tool holder 5 and with the cylinder 6 to couple the tool holder 5 and the cylinder 6 together such that the tool holder 5 and the cylinder 6 integrally rotate (i.e., rotate as a single unit). More specifically, the coupling member 7 in this embodiment is a single cylindrical member (also referred to as a sleeve or a ring). The coupling member 7 is configured to fit with an inner periphery of the large diameter part 55 of the tool holder 5 and with an outer periphery of the cylinder 6. The coupling between the coupling member 7 and the large diameter part 55 of the tool holder 5 for the integral rotation thereof and the coupling between the coupling member 7 and the cylinder 6 for the integral rotation thereof are achieved by engagement between recesses and protrusions.

Specifically, the coupling member 7 has a plurality of outer protrusions 71 and a plurality of inner protrusions 73. The outer protrusions 71 protrude radially outward from the outer peripheral surface of the coupling member 7 and the inner protrusions 73 protrude radially inward from the inner peripheral surface of the coupling member 7. In this embodiment, there are four outer protrusions 71 that are disposed at the same intervals in the circumferential direction. The outer protrusions 71 each has a rectangular or trapezoidal section and extends in substantially parallel to the driving axis DX (i.e., extends in the front-rear direction). Similarly, in this embodiment, there are four inner protrusions 73 that are disposed at the same intervals in the circumferential direction. The inner protrusions 73 each has the substantially same configuration as the outer protrusion 71.

Four grooves 551 that correspond to the four outer protrusions 71 are formed on the inner peripheral surface of the rear end portion of the large diameter part 55 of the tool holder 5. The grooves 551 each has a shape that conforms to (matches) the outer protrusion 71 and extends frontward from the rear end of the large diameter part 55 in substantially parallel to the driving axis DX. Further, four grooves 63 that correspond to the four inner protrusions 73 are formed on the outer peripheral surface of the insertion part 61 of the cylinder 6. The grooves 63 each has a shape that conforms to (matches) the inner protrusion 73 and extends from the front end of the cylinder 6 in substantially parallel to the driving axis DX. The grooves 63 extend over an entire length of the insertion part 61 in the front-rear direction. A positioning protrusion 64 is provided behind the rear end of the groove 63. The positioning protrusion 64 protrudes radially outward from the outer peripheral surface of the cylinder 6. The rear end of the coupling member 7 has a flange 75 that protrudes radially outward.

When the rotary hammer 1 is assembled, the coupling member 7 is positioned in the circumferential direction relative to the cylinder 6 such that the inner protrusions 73 and the grooves 63 fit with each other, and then the coupling member 7 is fitted onto the outer periphery of the cylinder 6 from the front thereof. The coupling member 7 is positioned such that the rear end thereof (the flange 75) abuts (is in contact with) the positioning protrusion 64 of the cylinder 6. Further, the tool holder 5 is positioned in the circumferential direction relative to the coupling member 7 such that the outer protrusions 71 and the grooves 551 fit with each other, and then the tool holder 5 is fitted onto the outer periphery of the coupling member 7 from the front thereof. The tool holder 5 is positioned such that the rear end thereof abuts (is in contact with) the flange 75 of the coupling member 7. Thus, the coupling member 7 has a function that positions the tool holder 5, in addition to a function that couples the tool holder 5 and the cylinder 6 together. This configuration eliminates the need for an additional structure for positioning the tool holder 5.

According to the above-described procedure, the tool holder 5 and the cylinder 6 are coupled to each other (rotationally fixed) via the coupling member 7 such that the tool holder 5 and the cylinder 6 are integrally rotatable. Both side surfaces of each groove 63 of the cylinder 6, both side surfaces of each inner protrusions 73 of the coupling member 7, both side surfaces of each outer protrusion 71, and both side surfaces of each groove 551 of the tool holder 5 serve as torque transmitting surfaces.

When a known rotary hammer that utilizes a coupling pin for coupling a tool holder and a cylinder is assembled, an assembler needs to precisely align a hole of the tool holder and a hole of the cylinder in the axial direction and the circumferential direction first, and then insert the coupling pin into the holes in the radial direction. Further, a member (part, component) for preventing the coupling pin from dropping off from the holes needs to be disposed radially outward of the coupling pin. On the other hand, the coupling structure between the tool holder 5 and the cylinder 6 of this embodiment only requires the assembler to position the tool holder 6, the coupling member 7, and the cylinder 6 sequentially in the circumferential direction and to fit them with each other (to move one of them rearward relative to another one of them) as described above. This configuration eliminates the need for the above-described member for preventing the coupling pin from dropping off from the holes. Thus, compared to the above-described known coupling structure that utilizes the coupling pin, a coupling operation of coupling the tool holder 5 and the cylinder 6 to be integrally rotatable can be facilitated and simplified. Further, because the rotary hammer 1 is free from the above-described member for preventing the coupling pin from dropping off, the radial dimension can be made relatively small.

The user of the rotary hammer 1 may sometimes grip a front end region of the rotary hammer 1 that is closer to the tool accessory 91, in order to stabilize the working posture. If the cylinder 6 and the medium diameter part 53 or the cylinder 6 and a portion frontward of the medium diameter part 53 (i.e., a portion closer to the tool accessory 91) are coupled, the cylinder 6 needs to be disposed radially outward of the tool holder 5 and the coupling member 7. In such a case, the diameter of the front end region of the rotary hammer 1 becomes relatively large. On the contrary, in this embodiment, the coupling member 7 is disposed radially inward of the tool holder 5 and the radially outward of the cylinder 6 at the rear end portion of the tool holder 5, which is located rearward of the medium diameter part 53 that slidably houses the impact bolt 35. This configuration is preferable because the diameter of the front end portion of the tool holder 5 and the diameter of the front end region of the rotary hammer 1 can be made relatively small.

In this embodiment, the coupling member 7 covers some of the ventilation holes 60 of the cylinder 6 from the radially outside thereof. For this reason, ventilation passages 70 are formed on the inner peripheral surface of the coupling member 7. In this embodiment, the ventilation passages 70 communicate with the ventilation holes 60, respectively, so as to allow the air to flow between the inner space and the outer space of the cylinder 6. Specifically, each of the ventilation passages 70 is formed as a groove that extends in the axial direction of the coupling member 7 over an entire length of the coupling member 7 in the front-rear direction (i.e., extends from the front end to the rear end). Thus, each of the ventilation passages 70 also allows the air to flow between a space in front of the coupling member 7 (i.e., the outer space of the cylinder 6 within the tool holder 5) and a space behind the coupling member 7 (i.e. the outer space of the cylinder 6 behind the tool holder 5). Accordingly, even if the coupling member 7 covers the ventilation holes 60, the function of the ventilation holes 60 can be maintained by the ventilation passages 70.

The supporting structures of the tool holder 5 and the cylinder 6 are now described.

As shown in FIG. 1, the tool holder 5 is rotatably supported at two positions in the front-rear direction, that is, at a substantially central portion and at the rear end portion, by a first bearing 131 and a second bearing 132, respectively. The first bearing 131 and the second bearing 132 are held by the inner housing 13. More specifically, the first bearing 131 is held in the front end portion of the barrel part 14 and fitted onto the outer periphery of the medium diameter part 53 of the tool holder 5. The second bearing 132 is held in the rear end portion of the barrel part 14 and fitted onto the outer periphery of the rear end portion of the large diameter part 55 of the tool holder 5. Thus, the second bearing 132 is fitted onto an outer periphery of a portion where a portion of the tool holder 5, the coupling member 7 and a portion of the cylinder 6 overlap with each other in the radial direction (this portion is hereinafter referred to as an overlapping portion 567).

The cylinder 6 is rotatably supported at two positions in the front-rear direction, that is, at the substantially central portion and at the rear end portion, by the second bearing 132 and a third bearing 133, respectively. The third bearing 133 is held by the inner housing 13. Thus, in this embodiment, the single second bearing 132 serves as a bearing that supports both of the tool holder 5 and the cylinder 6 at the overlapping portion 567. The second bearing 132 can stably support the tool holder 5 and the cylinder 6 that are coupled via the coupling member 7 to integrally rotate, by supporting the overlapping portion 567. The third bearing 133 is held in the gear housing 15 and fitted onto an outer periphery of a support part of the large bevel gear 374 that is fixed around the rear end portion of the cylinder 6.

In this embodiment, each of the tool holder 5 and the cylinder 6 is a metal member (e.g., an iron member) formed by means of machining. On the other hand, the coupling member 7 is made of sintered metal (a sintered member (part, component)) for making the coupling member 7 lighter in weight.

In this embodiment, the coupling member 7 is interposed between the tool holder 5 and the cylinder 6 in the radial direction as described above. Consequently, as shown in FIG. 2, a space (gap) is formed between the inner peripheral surface of the large diameter part 55 of the tool holder 5 and the outer peripheral surface of the insertion part 61 of the cylinder 6, in front of the coupling member 7. An idle-striking prevention mechanism 65 is disposed in this space. The idle-striking prevention mechanism 65 is disposed on (intersected by) a straight line that extends from the coupling member 7 in substantially parallel to the longitudinal axis LX1 of the tool holder 5.

The idle-striking prevention mechanism 65 includes a movable sleeve 651 and a biasing spring 653. The movable sleeve 651 is a cylindrical member that is fitted around the outer periphery of the front end portion of the cylinder 6 to be slidable in the front-rear direction. The biasing spring 653 is disposed between the movable sleeve 651 and the coupling member 7 in the front-rear direction. A front end of the biasing spring 653 is in contact with the movable sleeve 651 and a rear end of the biasing spring 653 is in contact with the coupling member 7. Thus, the coupling member 7 has a function of a spring seat for the biasing spring 653, in addition to the function that couples the tool holder 5 and the cylinder 6. The movable sleeve 651 is biased forward relative to the cylinder 6 by the biasing force of the biasing spring 653 so as to bias the impact bolt 35 forward.

In the no-load state in which the tool accessory 91 is not pressed rearward into the tool holder 5, the movable sleeve 651 is located at a position where the movable sleeve 651 allows the air in the cylinder 6 to be released. Thus, the striker 34 is prevented from striking the impact bolt 35 (i.e., the so-called idle striking is prevented).

The vibration reduction mechanism 8 is now described.

The vibration reduction mechanism 8 is configured to reduce a possibility of vibration caused by a backlash (unexpected looseness or a gap) between the tool holder 5 and the tool accessory 91. The vibration reduction mechanism 8 is disposed around the driving axis DX. As shown in FIG. 2, the vibration reduction mechanism 8 of this embodiment includes a first elastically holding part 81 and a second elastically holding part 82 disposed at the small diameter part 51 of the tool holder 5. The second elastically holding part 82 is spaced apart rearward from the first elastically holding part 81 in the front-rear direction. The first elastically holding part 81 and the second elastically holding part 82 are each configured to elastically hold the shank 911 while applying biasing forces that act radially inward of the tool holder 5 to the shank 911 such that the biasing forces applied to the shank 911 balance with each other.

As shown in FIGS. 2 and 3, each of the first elastically holding part 81 and the second elastically holding part 82 includes three balls 83, three interposed members 84, and one elastic ring 87. The elastic ring 87 of the first elastically holding part 81 and the elastic ring 87 of the second elastically holding part 82 have different sizes in an axial direction and in a radial direction of the elastic ring 87, but have substantially the same function.

The balls 83 are held by the small diameter part 51 to be movable in the radial direction of the tool holder 5. More specifically, a front portion (a portion frontward of the elongate holes 514) of the small diameter part 51 of the tool holder 5 has three holding holes 517 for the balls 83 of the first elastically holding part 81. The rear end portion (a portion rearward of the elongate holes 514) of the small diameter part 51 of the tool holder 5 has three holding holes 517 for the balls 83 of the second elastically holding part 82.

The three holding holes 517 are disposed at the same positions in the front-rear direction and disposed at the same intervals in the circumferential direction around the longitudinal axis LX1 (the driving axis DX). The holding holes 517 are disposed not to overlap with (to be offset from) the above-described protrusions 513 and elongate holes 514. Each of the holding holes 517 is a through hole that extends in the radial direction of the small diameter part 51 and communicates with the inner space and the outer space of the small diameter part 51. In each of the first elastically holding part 81 and the second elastically holding part 82, the three balls 83 are rollably disposed within the three holding holes 817, respectively. An inside end in the radial direction of each of the holding holes 517 is configured such that the corresponding ball 83 does not get out of the holding hole 517 from the inside end in the radial direction. The balls 83 of this embodiment are each made of metal (for example, steel).

The interposed members 84 are configured to rollably receive (hold, retain) the balls 83, respectively. The interposed members 84 are disposed between the respective balls 83 and the elastic ring 87 and is held by the small diameter part 51 to be movable in the radial direction of the tool holder 5. More specifically, the interposed members 84 each has a receiving surface 85 that substantially conforms to a portion of an outer peripheral surface (spherical surface) of the ball 83. The interposed members 84 are disposed radially outward of the respective balls 83 within the holding holes 517 and are slidable within the holding holes 517. The interposed members 84 of this embodiment are each made of metal (for example, steel).

The elastic ring 87 is an annular elastic member having a uniform inner diameter and a uniform outer diameter. In each of the first elastically holding part 81 and the second elastically holding part 82, the elastic ring 87 is fitted onto the outer periphery of the small diameter part 51 so as to cover the three holding holes 517. The elastic ring 87 is configured to bias the balls 83 radially inward via the respective interposed members 84. The elastic ring 87 of this embodiment is made of rubber.

Owing to the above-described structure, when the shank 911 of the tool accessory 91 is not inserted into the small diameter part 51 of the tool holder 5, the balls 83 are located at the innermost position in the radial direction within the respective holding holes 517 by the biasing force of the elastic ring 87. At this time, a portion of each ball 83 protrudes into the inside of the small diameter part 51 from the holding hole 517. When the shank 911 is inserted into the small diameter part 51, the balls 83 come into contact with the outer peripheral surface of the shank 911 and are pressed by the outer peripheral surface so as to move radially outward together with the respective interposed members 84 against the biasing force of the elastic ring 87. While the shank 911 is within the small diameter part 51, the balls 83 are biased radially inward by the elastic ring 87 and are pressed against the shank 911 to be rollable on the outer peripheral surface of the shank 911 (see FIG. 3).

As shown in FIG. 2, in this embodiment, the elastic ring 87 of the first elastically holding part 81 is held between the chuck ring 571 and the chuck cover 585 in the front-rear direction. The elastic ring 87 of the first elastically holding part 81 has a function that relaxes impact in the front-rear direction, in addition to a function that biases the balls 83 radially inward.

More specifically, when the idle striking occurs, the tool accessory 91 that is struck by the impact bolt 35 may cause the tool retainers 515 to move forward at a high speed to collide with the chuck ring 571. The elastic ring 87 can relax the impact from the chuck ring 571 to the chuck cover 585 and the cap 583 when collided by the tool retainers 515. The elastic ring 87 is usually employed in existing rotary hammers for relaxing the impact. Thus, by setting the position of the first elastically holding part 81 to correspond to the position of the elastic ring 87 in the existing rotary hammer, the first elastically holding part 81 can be formed without employing an additional component.

The elastic ring 87 of the second elastically holding part 82 is held in position by utilizing the above-described holding mechanism 57 of the tool retainers 515. Specifically, an annular holding groove is formed on an inner peripheral surface of a cylindrical portion of the rear spring receiver 575. The elastic ring 87 is fitted into and thus held by the annular holding groove. Thus, the elastic ring 87 of the second elastically holding part 82 has an axial dimension and a radial dimension smaller than those of the elastic ring 87 of the first elastically holding part 81, while the elastic ring 87 of the second elastically holding part 82 functions in the substantially same manner to the elastic ring 87 of the first elastically holding part 81. As described above, in this embodiment, a part of the holding mechanism 57 of the tool retainer 515 is utilized for holding the elastic ring 87 of the second elastically holding part 82.

The action of the vibration reduction mechanism 8 is now described.

When the rotary hammer 1 operates in the hammer-only mode or in the rotary hammer mode, the tool accessory 91 linearly reciprocates in the front-rear direction. At this time, the outer peripheral surface 912 of the shank 911 of the tool accessory 91 slides along the inner peripheral surface 511 of the small diameter part 51 of the tool holder 5. However, a backlash may be formed between the outer peripheral surface 912 of the shank 911 and the inner peripheral surface 511 of the small diameter part 51 due to, for example, dimensional error. In such a case, when the shank 911 reciprocatingly slides within the small diameter part 51, the longitudinal axis LX2 of the tool accessory 91 may tilt relative to the longitudinal axis LX1 of the tool holder 5 (misalignment), so that vibration or noise may occur due to the collision of the shank 911 with the inside of the small diameter part 51.

To cope with this problem, in this embodiment, the first elastically holding part 81 and the second elastically holding part 82 are disposed on the small diameter part 51, which slides relative to the shank 911, and elastically hold the shank 911 while biasing the shank 911 radially inward such that the biasing forces applied to the shank 911 balance with each other. Thus, even if a backlash is between the shank 911 and the small diameter part 51, a possibility of the misalignment can be reduced. Accordingly, the vibration that is caused when the shank 911 collides with the inside of the small diameter part 51 can be reduced. Further, the elastic ring 87 can attenuate the vibration of the tool accessory 91.

Further, when the rotary hammer 1 operates in the rotary hammer mode, the rotational axis of the tool accessory 91 can be made stable.

In particular, in this embodiment, the first elastically holding part 81 and the second elastically holding part 82 bias the shank 911 radially inward and thus elastically hold the shank 911 at two positions that are at spaced apart in the front-rear direction. Thus, compared to a configuration in which only one of the first elastically holding part 81 and the second elastically holding part 82 is provided, a possibility of the misalignment can be more reliably reduced. Further, the two elastic rings 87 can more effectively attenuate the vibration of the tool accessory 91.

Further, in this embodiment, in each of the first elastically holding part 81 and the second elastically holding part 82, the three balls 83 are disposed at the same intervals in the circumferential direction such that the biasing forces of the elastic ring 87 applied to the shank 911 via the three balls 83 balance with each other. Thus, a force toward a single direction is prevented from being applied to the tool accessory 91, and thus a possibility of the misalignment can be further reliably reduced. Further, only one elastic ring 87 can effectively bias the three balls 83 radially inward, without increasing the number of components. Further, the elastic ring 87 can effectively attenuate the vibration of the tool accessory 91, by utilizing the characteristic of rubber. Further, the interposed members 84 can each facilitate rotation of the ball 83 and thus suppress wear of the elastic ring 87, compared to a configuration in which the rubber elastic ring 87 directly receives the balls 83.

Correspondences between the components (features) of the above-described embodiment and the components (features) of the present disclosure or the present invention are as follows. However, the components of the embodiment are merely exemplary, and do not limit the components of the present disclosure or the present invention.

The inner housing 12 is an example of a "tool body" of the present disclosure. The second bearing 132 is an example of a "bearing". The groove 551 is an example of a "recess". The outer protrusion 71 is an example of a "protrusion". The groove 63 is an example of a "recess". The inner protrusion 73 is an example of a "protrusion". The movable sleeve 651 is an example of a "movable member". The biasing spring 653 is an example of a "spring". The medium diameter part 53 of the tool holder 5 is an example of a "slide part".

The above-described embodiment is merely exemplary, and the rotary hammer according to the present disclosure is not limited to the rotary hammer 1 of the above-described embodiment. For example, the following non-limiting modifications may be made. Further, at least one of these modifications may be employed in combination with at least one of the rotary hammer 1 of the above-described embodiment and the claimed features.

The coupling structure of the cylinder 6 and the tool holder 5 via the coupling member 7 may be appropriately changed, as long as the coupling member 7 is between the tool holder 5 and the cylinder 6 in the radial direction and couples them to be integrally rotatable. For example, the shapes, number, and arrangements of the grooves 551, 63, the outer protrusions 71 and the inner protrusions 73 may be appropriately changed. Further, opposite to the embodiment, the tool holder 5 and the coupling member 7 may be coupled by engagement between a protrusion formed on the inner peripheral surface of the tool holder 5 and a groove formed on the outer peripheral surface of the coupling member 7. A similar modification may be applied to the coupling between the cylinder 6 and the coupling member 7.

The structure of the tool holder 5 and the elements disposed in the tool holder 5 may be appropriately changed. For example, the shapes, number and arrangements of the protrusions 513 and the elongate holes 514 of the tool holder 5 are merely exemplary and thus may be appropriately changed based on the engaging structure with the tool accessory 91. Further, the vibration reduction mechanism 8 may be omitted. The structure of the cylinder 6 and the elements disposed in the cylinder 6 may be appropriately changed. For example, the shapes, number and arrangements of the ventilation holes 60 of the cylinder 6, and the structure and arrangement of the idle-striking prevention mechanism 65 may be appropriately changed. Alternatively, any of those components may be omitted.

Further, in view of the nature of the present invention and the above-described embodiment, the following Aspects can be provided. At least one of the following Aspects can be employed in combination with at least one of the above-described embodiment, the above-described modifications and the claimed features.

(Aspect 1)

The coupling member is a single cylindrical member (sleeve, or ring).

(Aspect 2)

The ventilation passage is a groove that is formed on the inner peripheral surface of the coupling member and that extends in the axial direction of the coupling member over an entire length of the coupling member.

(Aspect 3)

A first end of the ventilation passage is open to a space formed within the tool holder and outside of the cylinder, and a second end of the ventilation passage is open to a space formed outside of the tool holder and the cylinder.

(Aspect 4)

The longitudinal axis defines a front-rear direction of the rotary hammer, and the rotary hammer further comprises:

a first bearing that rotatably supports the front end portion of the tool holder, a second bearing that rotatably supports an overlapping portion where the rear end portion of the tool holder, the coupling member and the cylinder overlap with each other in the radial direction, and a third bearing that rotatably supports a rear end portion of the cylinder.

(Aspect 5)

The rotary hammer further comprises:

a motor that has a motor shaft;

a piston that is housed in the cylinder to be slidable along the longitudinal axis, wherein the piston is operably coupled to the motor shaft and is configured to reciprocate along the longitudinal direction in response to rotation of the motor shaft;

a striker that is housed in the cylinder to be slidable along the longitudinal axis, wherein the striker is configured to reciprocate in response to reciprocation of the piston;

an impact bolt that is housed in the tool holder to be slidable along the longitudinal axis, wherein the impact bolt is configured to strike the tool accessory in response to being struck of the striker; and a plurality of gears that is operably coupled to the motor shaft, wherein the gears are configured to rotate the tool holder in response to rotation of the motor shaft.

DESCRIPTION OF THE REFERENCE NUMERALS

1: rotary hammer, 10: main housing, 13: inner housing, 131: first bearing, 132: second bearing, 133: third bearing,

14: barrel part, 15: gear housing, 17: handle, 171: grip part, 175: switch lever, 176: switch, 2: motor, 25: motor shaft, 3: driving mechanism, 31: motion converting mechanism, 311: crank shaft, 313: connection rod, 315: piston, 32: air chamber, 33: striking mechanism, 34: striker, 35: impact bolt, 351: large diameter part, 352: outer peripheral surface, 353: small diameter part, 37: rotation transmitting mechanism, 371: intermediate shaft, 372: small bevel gear, 374: large bevel gear, 5: tool holder, 51: small diameter part, 511: inner peripheral surface, 513: protrusion, 514: elongate hole, 515: tool retainer, 517: holding hole, 53: medium diameter part, 531: inner peripheral surface, 55: large diameter part, 551: groove, 567: overlapping portion, 57: holding mechanism, 571: chuck ring, 573: front spring receiver, 575: rear spring receiver, 577: spring, 581: release cover, 583: cap, 585: chuck cover, 6: cylinder, 60: ventilation hole, 61: insertion part, 63: groove, 64: positioning protrusion, 65: idle-striking prevention mechanism, 651: movable sleeve, 653: biasing spring, 7: coupling member, 70: ventilation passage, 71: outer protrusion, 73: inner protrusion, 75: flange, 8: vibration reduction mechanism, 81: first elastically holding part, 82: second elastically holding part, 83: ball, 84: interposed member, 85: receiving surface, 87: elastic ring, 91: tool accessory, 911: shank, 912: outer peripheral surface, 913: rectangular groove, 914: semicircular groove, DX: driving axis, LX1: longitudinal axis, LX2: longitudinal axis

What is claimed is:

1. A rotary hammer comprising:

a tool body;

a tool holder that (i) has a cylindrical shape and a longitudinal axis, (ii) is configured to hold a tool accessory to be movable along the longitudinal axis and (iii) is supported by the tool body to be rotatable around the longitudinal axis;

a cylinder that (i) extends coaxially with the tool holder and (ii) is supported by the tool body to be rotatable around the longitudinal axis; and a coupling member that (i) is between the tool holder and the cylinder in a radial direction of the tool holder, and (ii) is engaged with the tool holder and the cylinder to couple the tool holder and the cylinder together such that the tool holder and the cylinder integrally rotate, wherein the tool holder and the cylinder are entirely spaced apart from each other in the radial direction.

2. The rotary hammer as defined in claim 1, wherein:

the longitudinal axis defines a front-rear direction of the rotary hammer, the tool holder has a front end portion and a rear end portion, the front end portion of the tool holder is configured to receive the tool accessory, and the rear end portion of the tool holder is disposed radially outward of the cylinder and is coupled to the cylinder via the coupling member.

3. The rotary hammer as defined in claim 2, wherein the coupling member is configured to define a position of the rear end portion of the tool holder in the front-rear direction.

4. The rotary hammer as defined in claim 2, wherein the coupling member is a sleeve that is fitted between the cylinder and the rear end portion of the tool holder in the radial direction.

5. The rotary hammer as defined in claim 4, wherein:

a groove or a protrusion extending in the front-rear direction is formed on an outer peripheral surface of the cylinder, a groove or a protrusion extending in the front-rear direction is formed on an inner peripheral surface of the rear end portion of the tool holder, and the sleeve has (i) a first protrusion or a first groove that is formed on an inner peripheral surface of the sleeve and engaged with the groove or the protrusion of the cylinder, and (ii) a second protrusion or a second groove that is formed on an outer peripheral surface of the sleeve and engaged with the groove or the protrusion of the rear end portion of the tool holder.

6. The rotary hammer as defined in claim 5, wherein:

a rear end of the sleeve has a flange that protrudes radially outward, and the flange is configured to abut a rear end of the tool holder to define a position of the tool holder in the front-rear direction.

7. The rotary hammer as defined in claim 6, wherein:

the cylinder has a positioning protrusion that protrudes radially outward, and the positioning protrusion is configured to abut a rear end of the flange of the sleeve to define a position of the sleeve in the front-rear direction.

8. The rotary hammer as defined in claim 1, wherein:

the tool holder and the coupling member are coupled to each other by way of engagement between a recess and a protrusion, and the cylinder and the coupling member are coupled to each other by way of engagement between a recess and a protrusion.

9. The rotary hammer as defined in claim 1, further comprising an idle-striking prevention mechanism that is disposed on a straight line that extends from the coupling member and that is substantially parallel to the longitudinal axis.

10. The rotary hammer as defined in claim 9, wherein:

the longitudinal axis defines a front-rear direction of the rotary hammer, the idle-striking prevention mechanism includes (i) a movable member that is disposed frontward of the coupling member in the front-rear direction and that is movable in the front-rear direction relative to the cylinder, and (ii) a spring that biases the movable member, and the coupling member is configured as a spring seat that receives a rear end of the spring.

11. The rotary hammer as defined in claim 1, wherein the coupling member is made of sintered metal.

12. The rotary hammer as defined in claim 1, wherein:

the longitudinal axis defines a front-rear direction of the rotary hammer, the rotary hammer further comprises an impact bolt that is disposed in the tool holder to be slidable in the front-rear direction and is configured to strike the tool accessory, and the coupling member is disposed rearward of a slide part, which is a portion of the tool holder along which an outer peripheral surface of the impact bolt slides.

13. The rotary hammer as defined in claim 1, further comprising a release cover configured to release holding of the tool accessory.

14. A rotary hammer comprising:

a tool body;

a tool holder that (i) has a cylindrical shape and a longitudinal axis, (ii) is configured to hold a tool accessory to be movable along the longitudinal axis and (iii) is supported by the tool body to be rotatable around the longitudinal axis;

a cylinder that (i) extends coaxially with the tool holder and (ii) is supported by the tool body to be rotatable around the longitudinal axis; and a coupling member that (i) is between the tool holder and the cylinder in a radial direction of the tool holder, and (ii) is engaged with the tool holder and the cylinder to couple the tool holder and the cylinder together such that the tool holder and the cylinder integrally rotate, wherein:

the longitudinal axis defines a front-rear direction of the rotary hammer, the tool holder has a front end portion and a rear end portion, the front end portion of the tool holder is configured to receive the tool accessory, the rear end portion of the tool holder is disposed radially outward of the cylinder and is coupled to the cylinder via the coupling member, the cylinder has a ventilation hole, the coupling member is disposed radially outward of the cylinder, and the coupling member has a ventilation passage that is configured to communicate with the ventilation hole to allow air to flow between an inner space of the cylinder and an outer space of the cylinder.

15. The rotary hammer as defined in claim 14, wherein:

the ventilation passage is a groove that is formed on an inner peripheral surface of the coupling member and that extends in an axial direction of the coupling member over an entire length of the coupling member, a first end of the ventilation passage is open to a space formed within the tool holder and outside of the cylinder, and a second end of the ventilation passage is open to a space formed outside of the tool holder and the cylinder.

16. A rotary hammer comprising:

a tool body;

a tool holder that (i) has a cylindrical shape and a longitudinal axis, (ii) is configured to hold a tool accessory to be movable along the longitudinal axis and (iii) is supported by the tool body to be rotatable around the longitudinal axis;

a cylinder that (i) extends coaxially with the tool holder and (ii) is supported by the tool body to be rotatable around the longitudinal axis;

a coupling member that (i) is between the tool holder and the cylinder in a radial direction of the tool holder, and (ii) is engaged with the tool holder and the cylinder to couple the tool holder and the cylinder together such that the tool holder and the cylinder integrally rotate; and a first bearing that is disposed around an outer periphery of an overlapping portion where the tool holder, the coupling member and the cylinder overlap with each other in the radial direction, wherein the tool holder and the cylinder are rotatably supported via the first bearing.

17. The rotary hammer as defined in claim 16, further comprising:

a second bearing that rotatably supports a front end portion of the tool holder; and a third bearing that rotatably supports a rear end portion of the cylinder.

* * * * *